(12) United States Patent
Chaar et al.

(10) Patent No.: US 9,747,734 B2
(45) Date of Patent: Aug. 29, 2017

(54) AUTHENTICATION OF USERS WITH TREMORS

(71) Applicant: International Business Machines Corporation, Armonk, NY (US)

(72) Inventors: Jarir K. Chaar, Ardsley, NY (US); Robert G. Farrell, Cornwall, NY (US); John C. Hartley, Round Rock, TX (US); Dimitri Kanevsky, Ossining, NY (US); Sharon M. Trewin, Croton-on-Hudson, NY (US)

(73) Assignee: International Busines Machines Corporation, Armonk, NY (US)

( * ) Notice: Subject to any disclaimer, the term of this patent is extended or adjusted under 35 U.S.C. 154(b) by 136 days.

(21) Appl. No.: 14/568,473

(22) Filed: Dec. 12, 2014

(65) Prior Publication Data

US 2016/0171804 A1  Jun. 16, 2016

(51) Int. Cl.
*G06F 3/16* (2006.01)
*G06F 3/01* (2006.01)
(Continued)

(52) U.S. Cl.
CPC ......... *G07C 9/00071* (2013.01); *G06F 3/016* (2013.01); *G06K 9/00* (2013.01);
(Continued)

(58) Field of Classification Search
CPC .......... G06F 2200/1637; G06F 3/0346; G06F 3/0418; G06F 3/04815; G06F 21/316; G06F 21/32; G06F 21/36; G06F 21/30; G06F 21/34; G06F 2221/2111; G06F 3/017; G06F 21/31; G06F 3/016; G07C 9/00071; G07C 9/00007; G07C 9/00111; G07C 9/00142; G07C 9/00158; A61B 5/1101; A61B 5/117; A61B 5/6825; A61B 5/6897; G06K 9/00; G06K 9/00885; G06K 9/00335; G06K 9/00031; G06K 9/00375; G06K 2009/00395; G08C 2201/32; G08C 2201/61; G08C 2201/31; H04L 9/3231;
(Continued)

(56) References Cited

U.S. PATENT DOCUMENTS 7,236,156 B2    6/2007  Liberty et al.
2004/0119682 A1  6/2004  Levine et al.
(Continued)

FOREIGN PATENT DOCUMENTS

EP    1895389 A2    3/2008

OTHER PUBLICATIONS

Ahmed, A. et al., "Tremors," Cleveland Clinic, Center for Continuing Education, http://www.clevelandclinicmeded.com/medicalpubs/diseasemanagement . . . , (last accessed Sep. 17, 2014 11:09 AM).

(Continued)

*Primary Examiner* — Dionne H Pendleton
(74) *Attorney, Agent, or Firm* — Daniel C. Housley (57) ABSTRACT

A device receives a first input for authenticating a user and determines the first input fails to authenticate the user. One or more errors are identified in the input which match a tremor pattern for the user and the one or more errors are corrected to generate a corrected input. The user is authenticated using the corrected input.

15 Claims, 9 Drawing Sheets

(51) Int. Cl.
*G07C 9/00* (2006.01)
*G06K 9/00* (2006.01)
*G06K 9/03* (2006.01)

(52) U.S. Cl.
CPC ....... *G07C 9/00142* (2013.01); *G06K 9/0055* (2013.01); *G06K 9/00912* (2013.01); *G06K 9/036* (2013.01); *G07C 9/00158* (2013.01)

(58) Field of Classification Search
CPC ......... H04M 1/72572; H04M 1/72577; H04M 2250/12; H04N 5/4403
See application file for complete search history.

(56) References Cited

U.S. PATENT DOCUMENTS

| | | | |
|---|---|---|---|
| 2005/0008148 A1 | 1/2005 | Jacobson | |
| 2005/0243061 A1* | 11/2005 | Liberty | A61B 5/1101 345/158 |
| 2008/0055259 A1 | 3/2008 | Plocher | |
| 2009/0320123 A1* | 12/2009 | Yu | G06F 21/316 726/16 |
| 2010/0115583 A1 | 5/2010 | Delia et al. | |
| 2011/0148633 A1* | 6/2011 | Kohlenberg | G06F 21/30 340/541 |
| 2013/0041290 A1 | 2/2013 | Kording et al. | |
| 2013/0100043 A1 | 4/2013 | Kolbe | |
| 2013/0283372 A1* | 10/2013 | Tsukamoto | H04L 9/3231 726/18 |

OTHER PUBLICATIONS

Bao, P. et al., "Smart Phone Use by Non-Mobile Business Users," MobileHCI 2011, Aug. 30-Sep. 2, 2011, Stockholm, Sweden, © 2011 ACM 978-1-4503-0541-9/11.

Clarke, N.L. et al., "Authenticating mobile phone users using keystroke analysis," Int. J. Inf. Secur. (2007) 6:1-14 DOI 10.1007/s10207-006-0006-6, published online Aug. 1, 2006, © Springer-Verlag 2006.

DiCrescenzo, G. et al., "Approximate Message Authentication and Biometric Entity Authentication," A.S. Patrick and M. Yung (Eds.): FC 2005, LNCS 3570, pp. 240-254, 2005, © Springer-Verlag Berlin Heidelberg 2005.

Dunphy, P. et al., "A Closer Look at Recognition-based Graphical Passwords on Mobile Devices," Symposium on Usable Privacy and Security (SOUPS) 2010, Jul. 14-16, 2010, Redmond, WA USA, © 2010 ACM 978-1-4503-0264-7/10/07.

Husain, I. "Researchers use iPhone accelerometer to diagnose Parkinson's disease tremor, test remote diagnosis potential," http://www.imedicalapps.com/2011/02/iphone-accelerometer-diagnose-p . . . .

Lethbridge-Cejku, M. et al., Summary Health Statistics for U.S. Adults: National Health Interview Survey, 2004, Series 10, No. 228, U.S. Department of Health and Human Services, Centers for Disease Control and Prevention, National Center for Health Statistics, Vital Health Stat 10(228). 2006.

Lift Labs, "LiftWare," International Essential Tremor Foundation, Research & Hope for Essential Tremor, http://www.essentialtremor.org/treatments/assistive-devices/liftware (last accessed Sep. 17, 2014 11:28 AM).

McGill, R. et al., "Towards the Development of Adaptive User Interfaces for Tremor Disabled Persons: A Blackboard Expert System Approach," Expert Systems in Medicine 17.1-3, Annual International Conference of the IEEE Engineering in Medicine and Biology Society, vol. 13, No. 3, 1991, CH3068-4/91/0000-1262.

Nicolau, H. et al., "Elderly Text-Entry Performance on Touchscreens," ASSETS'12, Oct. 22-24, 2012, Boulder, Colorado, USA, © 2012 ACM 978-1-4503-1321-6/12/10.

Unknown, "Tremor Fact Sheet," National Institute of Neurological Disorders and Stroke, http://wwww.ninds.nih.gov/disorders/tremor/detail_tremor.htm (last modified Jul. 24, 2014; last accessed Sep. 17, 2014 11:27 AM).

Popa, A., "Tracking hand tremor on touchscreen," Thesis at the Media Computing Group, Prof. Dr. Jan Borchers, Computer Science Department, RWTH Aachen University, registration date: Jul. 9, 2011, submission date: Mar. 21, 2012.

Popovic, L., "Extraction of tremor for control of neural protheses: Comparison of Discrete Wavelet Transform and Butterworth filter," Neural Network Applications in Electrical Engineering, 2008, Sep. 25-27, 2008, Belgrade, DOI: 10.1109/NEUREL.2008.4685591, IEEE.

Teh, P.S. et al., "Review Article: A Survey of Keystroke Dynamics Biometrics," Hindawi Publishing Corporation, The Scientific World Journal, vol. 2013, Article ID 408280, 24 pages, © 2013 Pin Shen Teh et al, http://dx.doi.org/10.1155/2013/408280.

Unknown, "Research and Markets: Global Retail Touch Screen Display Market 2014-2018: One of the Main Drivers Copntributing to Market's Growth is the Use of Hi-Tech Touchscreen Display," © 2008 SYS-CON Media Inc. http://marketresearch.utilitzer.com/node/2940792/print (last accessed Sep. 17, 2014 11:12 AM).

Veluvolu, K.C. et al., "Estimation of Physiological Tremor from Accelerometers for Real-Time Applications," Sensors 2011, 11, 3020-3036; doi:10.3390/s110303020, ISSN 1424-8220 www.mdpi.com/journal/sensors, in revised form: Feb. 28, 2011 / Accepted: Mar. 4, 2011 /Published: Mar. 7, 2011.

Veluvolu, K.C. et al., "Multistep Prediction of Physiological Tremor for Surgical Robotics Applications," Biomedical Engineering, IEEE Transactions on (vol. 60 , Issue: 11 ), Nov. 2013, pp. 3074-3082, DOI 10.1109/TBME.2013.2264546, IEEE Engineering in Medicine and Biology Society.

* cited by examiner

AUTHENTICATION OF USERS WITH TREMORS

BACKGROUND

The present disclosure relates to security of computing devices, and more specifically, to user authentication on computing devices.

Tremors are involuntary muscle contractions and relaxations involving movement of one or more body parts. Existing authentication methods can be difficult for users with tremors. For example, it may be difficult for people with tremors to type long alpha-numeric passwords in mobile phones and other small devices. Users with tremors may make mistakes such as striking an incorrect key, repeating a key, or missing a key. The number of such committed mistakes is particularly high when people with tremors use touch screen text entry.

SUMMARY

According to embodiments of the present disclosure, a method for authenticating users is disclosed. The method includes receiving, by a device, a first input for authenticating a user and determining the first input fails to authenticate the user. The method further includes identifying one or more errors in the input which match a tremor pattern for the user, and correcting the one or more errors to generate a corrected input. The method further includes authenticating the user using the corrected input.

Further disclosed herein are embodiments of a computer program product for authenticating users. The computer program product includes a computer readable storage medium having program instructions embodied therewith. The program instructions are executable by a computing device to cause the device to perform a method. The method includes receiving, by a device, a first input for authenticating a user and determining the first input fails to authenticate the user. The method further includes identifying one or more errors in the input that match a tremor pattern for the user and correcting the one or more errors to generate a corrected input. The method further includes authenticating the user using the corrected input.

Further disclosed herein are embodiments of a system for authenticating users. The system includes one or more processors, one or more computer-readable memories, one or more computer-readable tangible storage devices, and program instructions stored on at least one of the one or more storage devices for execution by at least one of the one or more processors via at least one of the one or more memories. The program instructions are configured to cause the system to perform a method. The method includes receiving, by a device, a first input for authenticating a user and determining the first input fails to authenticate the user. The method further includes identifying one or more errors in the input that match a tremor pattern for the user and correcting the one or more errors to generate a corrected input. The method further includes authenticating the user using the corrected input.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the authentication of users with tremors on a computing device. While the present disclosure is not necessarily limited to such applications, various aspects of the disclosure may be appreciated through a discussion of various examples using this context.

As current generations are getting older and the older persons are using technology more and more, the number of users experiencing problems caused by tremors when using technology will increase. This means that the user experience that they feel now will start to degrade. Simple tasks like pushing a button, dragging items across the screen, pinching and stretching gestures, or rotating become harder to accomplish or the result of such actions is not the intended one because of the tremor's influence on the hand while trying to accomplish the task.

With more and more mobile devices used for sensitive transactions, applications now require more authentications more frequently. Corporate use of mobile devices is frequently dictating the use of long, complex passwords, derived from desktop password policies. Because of security threats and changing devices, passwords have to be changed periodically. Some applications lock users out after several failed attempts, for security reasons, and users with a tremor can easily be locked out of their accounts by this feature. Software and devices that correct tremor related errors for improved authentication could offer assistive technologies for touch screen devices of all types, including smart phones, tablets, computers, video games, e-books, self-checkout counters and other retail devices, hand-held gaming consoles, ATMs, airport check-ins, automotive, home automation, and more.

Tremors can be classified on clinical and etiologic bases. Signs and symptoms depend on tremor type and cause. They vary by intensity and frequency. Existing work on correcting user input for tremors, whether for authentication or other reasons, is either tuned to one particular type of tremor or only provides a generic solution. Common types of tremor include physiologic, enhanced physiologic, essential, Parkinson's, Cerebellar, Drug-induced, systemic disease, psychogenic, and orthostatic.

Physiologic tremor is a very-low-amplitude fine tremor (6 Hz to 12 Hz) that is barely visible to the naked eye. It is present in every normal person while maintaining a posture or movement. Neurologic examination results of patients with physiologic tremor are usually normal.

Enhanced physiologic tremor is a high-frequency, low-amplitude, visible tremor that occurs primarily when a specific posture is maintained. Drugs and toxins induce this form of tremor. The suspected mechanism is mechanical activation at the muscular level. Signs and symptoms of drug toxicity or other side effects might or might not be present. Tremor symptoms can improve after the causative agents are discontinued.

Essential tremor is the most common form of all movement disorders. Classic essential tremor is predominantly a postural- or action-type tremor, and usually the patient has a positive family history of tremor. Drinking alcohol often temporarily reduces the tremor. Other associated symptoms can include mild gait difficulty and, as a group, patients with essential tremor have increased hearing disability compared with controls or patients with Parkinson's disease. The degree of hearing impairment seems to correlate with the tremor severity. Essential tremor is characterized by a latency of 1-2 seconds. The latency is the time interval starting with the outstretched posture and ending with tremor onset.

Parkinson's tremor is a low-frequency rest tremor typically defined as a pill-rolling tremor. Some patients also have postural and action tremors. Parkinson's tremor usually occurs in association with other symptoms, such as micrographia, slowness (bradykinesia), and rigidity. Usually, there is no family history of Parkinson's tremor, and alcohol consumption does not decrease movement. Parkinson's tremor is characterized by a latency of 8-9 seconds. Parkinson's has four key characteristics: A distinct 4 to 6 Hz tremor at rest, cogwheel rigidity or increased tone, hypokinesia, and abnormal gait or posture. The tremor at rest can sometimes be the first indicator of Parkinson's disease. Researchers were able to show frequencies in the range of 5 to 10 Hz are characteristics of a patient with Parkinson's disease.

Cerebellar tremor is a low-frequency (<4 Hz) intention tremor that usually occurs unilaterally. Common causes are multiple sclerosis, stroke, and cerebellar injury. Signs and symptoms of cerebellar dysfunction may be present, including ataxia, dysmetria, dysdiadochokinesia, and dysarthria.

Holmes' tremor or rubral tremor designates a combination of rest, postural, and action tremors due to midbrain lesions in the vicinity of the red nucleus. This type of tremor is irregular and low frequency (4.5 Hz). Signs of ataxia and weakness may be present. Common causes include cerebrovascular accident and multiple sclerosis, with a possible delay of 2 weeks to 2 years in tremor onset and occurrence of lesions.

Drug-induced tremors include enhanced physiologic tremor, rest tremor, and action tremor. Signs and symptoms of drug-induced tremors depend on the drug used and on a patient's predisposition to its side effects. Some drugs cause extrapyramidal side effects manifesting as bradykinesia, rigidity, and tremor.

Tremor due to systemic disease usually occurs when the patient is moving or assumes a specific position. Associated symptoms include asterixis, mental status changes, and other signs of systemic illness. Diseases such as thyrotoxicosis and hepatic failure as well as delirium tremens and drug withdrawal are among the common causes.

Psychogenic tremor can involve any part of the body, but it most commonly affects the extremities. Usually, tremor onset is sudden and begins with an unusual combination of postural, action, and resting tremors. Psychogenic tremor decreases with distraction and is associated with multiple other psychosomatic complaints.

Orthostatic tremor is considered to be a variant of essential tremor. This type of tremor occurs in the legs immediately on standing and is relieved by sitting down. Orthostatic tremor is usually high frequency (14 Hz to 18 Hz), and no other clinical signs or symptoms are present.

Embodiments of the present disclosure may provide for authenticating users on a computing device using a tremor pattern. The computing device may be any digital device which receives input from a user including a personal computer, laptop computer, tablet, smart phone, digital thermostat, or TV remote control. The input may be received through a keyboard, touchscreen, pointing device, eye tracking, or any other method. A device profile may be accessed which maintains characteristics and context of the device that are relevant to tremors. A tremor profile may be accessed which maintains the characteristics of a tremor. The device profile and tremor profile may be used to generate a tremor pattern. The tremor pattern is used to identify and correct mistakes when a user attempts authentication and fails due to a tremor.

The device profile may consist of a set of targets that are used by one or two hands in a particular 3-D configuration. Targets are locations that may be selected by a user providing an input into the device in order to authenticate. Targets may be physical, such as the keys on a keyboard, or targets may also be elements of a user interface, such as active areas on a touchscreen that are associated with providing an input to the device. For example, targets may be the keys of an on-screen keyboard on a smartphone. Targets may also require a particular behavior. For example, a key on a keyboard may need to be pressed by pressing both the Shift key and the key itself.

A device profile may contain information on the location of each target, size of each target, distance between targets, and required behavior such as pressing two targets at once. The device profile may further include information on the pressure needed to activate a target. It may also include the time needed to press the target. The device profile may change during the use of the device. For example, the specific configuration of targets may change by programmatic or user control.

The tremor profile maintains characteristics of a tremor. The tremor profile may be a generic tremor profile or may be user-specific. Tremor profiles may include amplitude, frequency, affected parts (such as one hand or both), and 3-D orientation. For example, amplitude may indicate the distance a hand may move up and down during a tremor, frequency may capture the slow-down or speed-up in fine motion of a hand as a result of medication or degree of exhaustion throughout a day, and the 3-D orientation may indicate the directions of movement of affected parts caused by tremors. Different affected parts may have different amplitudes, frequencies and orientations. Frequency may be due to shaking of affected parts due to tremors measured in movement cycles per unit time. Generic tremor profiles may be stored based on specific types of tremors. User-specific tremor profiles may be generated from medical diagnoses, input by a user, or detected by the device. For example, a tremor profile for a user with a physiologic tremor may be initialized to a frequency of 6 Hz. A device may generate a tremor profile using sensors on the device such as an accelerometer or gyroscope to detect tremors. For example, a user may hold the device for a period of time as the device gathers information from its sensors.

Sensors not on the device may also be used to provide data to the system to initialize the tremor profile. For example, a medical device may measure the amplitude and frequency of the tremor and transmit this information over a data network to the device performing the authentication. Data transmitted from an alcohol detection device may be used to reduce the amplitude and frequency of the tremor profile. Data from sensors on the device and these external sensors may be combined when generating the tremor profile.

The device profile and tremor profile are used to create a tremor pattern that indicates possible errors on the device due to the tremor. The tremor pattern may include a confusion matrix for each target on the device. For example, there may be a confusion matrix for each key on a keyboard. The confusion matrix for a given key may indicate possible errors and probabilities associated with the errors for the key given the tremor profile. For example, given a device profile with four possible targets that are the letter keys D, F, G, and H, there are 4 confusion matrices, one for each letter key. Each confusion matrix may have one or two possible errors if the only errors are to substitute an adjacent key: D could be typed instead of F, F could be typed as D or G, G could be typed as F or H, and H could be typed as G. The device profile would also specify that the points where people tend to type in the keys are 2 cm apart. A tremor profile may specify a tremor with amplitude of 2 cm then there is an increased probability of pressing neighboring keys, but this error probability is repeated in multiple confusion matrices. For example, there may be a higher probability for G in the letter F confusion matrix but also a higher probability for H in the letter G matrix. Errors may include omissions, insertions, or substitutions. Omissions may occur when a tremor causes a user to miss a target without hitting a different target. The confusion matrix for each target may include a missed target error that may include a probability of an omission given the target. Insertions may occur when the tremor causes a bounce error (i.e. hitting the same target twice), or an unintended hit on a different target. Substitutions may occur when a tremor causes a user to miss a target and hit a different target. If a device profile changes a tremor pattern may be updated. For example, possible errors and probabilities associated with errors for a key may be modified if the key is difficult to press given device profile. If targets are generated programmatically then a confusion matrix may be updated because of changed location, size, and spacing of the targets in a device profile. A gyroscope in the device can be used to measure the direction and amount of rotation along all three axes. The tremor pattern may be different in different orientations of the device. For example, there may be different error probabilities if the device is at an angle versus flat.

The confusion matrices may be generated by taking into account: the expected distance of errors from targets based on the amplitude and orientation of the tremor; the expected direction of errors based on the orientation of the tremor; the expected probability and timing of bounce errors (hitting a target twice) based on the frequency, amplitude, and orientation of the tremor; and the expected errors for a given affected part, such as the hand typically used for a given target on the device or the hand determined, for example, by fingerprint identification.

A user may attempt authentication by providing an input using targets on the device. If the authentication attempt fails, the tremor pattern and correct password are used to determine if the errors in the authentication can be explained by a tremor. For errors that can be explained by a tremor, those errors in the input may be corrected and authentication may be done with the corrected input.

For example, a user may attempt to enter the password "DOLL" to authenticate the user. The user may, due to a tremor, type an "S" instead of the "D" and bounce on an "L" to enter an extra "L." Thus, the user may enter "SOLLL." If the entry is explained by the tremors, the user may be authenticated even though the password is wrong. The errors in the password are explained by the tremors if the probability of making the combination of errors given the tremors is significantly higher than a base probability. The base probability may be the probability of making the combination of errors in the general population of users of the device. For example, there is a small probability of anyone typing an "S" instead of "D" because they slip or are not looking and so on. However, there is a much higher probability of making this particular error if the person has tremors. Similarly, the probability of making a bounce error on the "L" and thus typing it twice in error is significantly higher given the tremors than the probability of making this error in the general population of users of the device. Furthermore, the timing of the 'L' characters can also be examined for typical or atypical patterns. When a user without a tremor types 'LL', the second key press is typically normally spaced in time, and the key presses are both of normal duration. The 'LL' that appears due to tremor typically has an unusually short gap between the keys and/or one of the keys is pressed down for an unusually short duration. The time between the onsets of the two key presses can be compared to the tremor frequency, providing further evidence that the extra key press was caused by tremor. Since the probabilities can be combined, the probability of the combination of errors is much greater than the probability of the combination of errors in the general population of users and thus the errors are explained by the tremors. In some cases, a longer password may be required to provide equivalent security. Even though this results in multiple accepted passwords, it may be unlikely that someone would make these precise errors without the tremor.

Authentication attempts may be monitored over time to modify the tremor pattern. For example, if a specific error is occurring more often than would be indicated by the tremor pattern, the tremor pattern may be updated to include the new probability. This may be useful if the original tremor pattern is based on a generic tremor or if the user's tremor has changed over time.

In some embodiments, the user's attempts to type known words (or select other targets) may be recorded and the errors used to modify the tremor pattern. For example, the user may be asked to type a known name, phone number, etc. and the resulting errors used to update a confusion matrix. A spelling correction system may suggest a spelling but require the user to type in the suggested spelling, thus collecting data on known words.

In some embodiments, the error may be associated with a sequence of keys instead of a single key. For example, attempting to press the ESC key and then the V key may cause keys in between such as Q, W, S, D or F to be pressed. In this case, a confusion matrix is anchored on the V key but the errors are associated with the ESC and V sequence rather than just V. Both the confusion matrix for the sequence and the confusion matrix for the individual target can be active and used to explain user inputs.

In some embodiments, the user may repeatedly perform authentication behaviors such as typing passwords. In some embodiments, there are 6-8 neighboring keys for a given key and, if the user mistypes a key, a count is incremented associated with the neighboring key in the given confusion matrix. For example, if K is expected and J is typed, then J would be incremented in the K confusion matrix. Key centroid and Euclidian distance may be used to determine the shape of the confusion matrices. For example, on some keyboards the J key may be 2 centimeters from the K key whereas on other keyboards the H key may be 2 cm from the K key and 1 cm from the J key. A tremor of a given amplitude may therefore cause the J key to be pressed in error on one keyboard and the H key on another. If a radius from the center of observed tap locations on a key or target (the centroid) defines a circle then the shape of the confusion matrix may be determined by the keys or target centroids within the circle. A device may have separate confusion matrices for portrait and landscape orientation, and for different keyboards. The amount of information needed to identify errors due to tremors may vary based on how pronounced the tremor is. For example, it may take more input to identify an error if the user has a slight tremor. Therefore the user may be required to specify a longer password if they have a slight tremor but the normal length password if they have a more pronounced tremor. The differing lengths of required passwords may be required to be within a security guideline.

In some embodiments, when the device continually monitors user input, mistyping errors can be tracked when a character is deleted immediately following its entry or when the character is modified by the self-correcting function in a program. The count(correct character, mistyped character) element of the count matrix is incremented by 1. The value of the confusion matrix between $character_i$ and $character_j$, is a probability, computed as the count($Character_i$, $Character_j$) cell divided by the sum of all count($Character_i$, $Character_k$), $0<k<N$ where N denotes the total number of characters supported by the keyboard or touchscreen. As such, both the count and confusion matrices are sparse N×N matrices with a significant number of zeroes, reflecting the fact that the majority of misses occur in the immediate vicinity of a character. Moreover, the count and confusion matrices between $character_i$ and $character_j$ capture the number and probability of hitting the correct $character_i$. Bounce errors for each character are counted as the number of extra copies of the character observed, with the probability of a bounce error being this count divided by the total number of intended taps on that character.

Reducing the complexity of both count and confusion matrices involves computing a centroid function for each character. The centroid of a character is defined as the sum, over all neighboring characters, of the product of count($Character_j$, $Character_k$) and distance($Character_i$, $Character_k$), where the distance denotes the Euclidean distance between the centers of the keys denoting $character_i$ and $character_j$, divided by the sum of all count($Character_i$, $Character_k$), $0<k<N$ where N denotes the total number of characters supported by the keyboard or touchscreen. The resulting centroid-based confusion and count matrices are single dimensional matrices with N elements, each corresponding to a supported character.

During authentication, the probability matrix or the centroid matrix may be used to find, in case of error, the probability of the observed character being typed by the user with tremors. This is accomplished by identifying the intended character and identifying the probability or centroid value for the character the user actually typed. If the probability is greater than a threshold value, the intended character is substituted for the mistyped one.

Correcting errors to inputs for authentication reduces security of the authentication. However, the level of security may still be adequate based on the length of the input and the number of corrections made. In some embodiments, a secondary form of authentication may be required if security is reduced beyond a certain threshold given the number of corrections made to the input. The secondary form of authentication may be any form of authentication such as voice authentication, facial or gesture recognition, or a second password input authentication.

A generic tremor pattern may indicate a low probability that the user will make any bounce errors or a disease-specific tremor pattern may indicate bounce errors with low probability, or other non-user-specific tremor patterns may indicate a low probability for this type of error. However, the user may repeatedly make bounce errors. In this case, the tremor pattern would not explain the error and the user with the tremor would not be authenticated. To address this problem, a training phase may be added. This training phase can be offered when the user initially receives the device or has their authentication configured. In the training phrase, the user attempts to type a sequence of targets and their errors are recorded. In one embodiment the user initially received their device, is configuring their authentication or registering, or has passed an authentication. The authenticated user is requested to press a sequence of known targets. Errors in pressing the known targets can then be used to update the tremor pattern. For example, even though the user may not be authenticated in the presence of bounce errors because the non-user-specific tremor pattern does not specify bounce errors, if an authenticated user is presented with a word to type and mistyped it consistently with bounce errors in a much higher probability than would be expected by the tremor profile, then the tremor pattern may be updated.

Many machine learning methods can be used to improve the confusion matrix probabilities given the user-specific error data.

Base error rates are important in determining the likelihood of errors. Given 100 attempts at typing a "D", we may find 95 times the user typed "D", 3 times the user typed "F", 2 times "G", and never "S". This pattern may fit their tremor pattern since the tremor does not generate bounce errors and has a certain amplitude that makes both "F" and G" likely errors. However, these probabilities are above the base error rates. For example, in 100 attempts, even users without a tremor may type "F" once in 100 tries. The tremor pattern is more likely if the pattern of errors is unlikely given the base error rate.

In some embodiments, the device may monitor sensors while the device is in use to detect changes in tremor patterns as a security mechanism. For example, if the device detects a sudden, significant change in tremor patterns, the device may require an additional authentication of the user to make sure an unauthorized user did not start using the device.

In some embodiments, the user may be authenticated by speech, inputting a password using a speech recognition system to transcribe speech to text or other means, speaking each letter or other vocalization. The user's voice may produce an error due to the tremor. Modifications of techniques herein could be used to correct the user's authentication attempt.

In some embodiments, the user's tremor characteristics may be estimated from video tracking. In other embodiments, the user's voice may be monitored for tremor characteristics.

In some embodiments, the device administrator in a business entity may implement security policies that restrict the applicability of the confusion matrix to a subset of the full set of input characters by mandating the use of specific characters in passwords and disabling any corrections of such characters based on intelligence gathered by the confusion matrix. Device management policies may also govern the format (e.g., encrypted or non-encrypted) and the location (e.g., device or server or virtual machine) for storing confusion matrices. Such policies will be tailored to the role of a user (privileged or non-privileged) in their enterprise and to whether a device is part of a pool of shared resources or is permanently allocated to the user. Furthermore, user profiles, confusion matrices, and security and management policies may be portable to a multitude of devices that share a standard layout for their input interface (keyboard, keypad, touch screen, . . . ).

Figure 1:
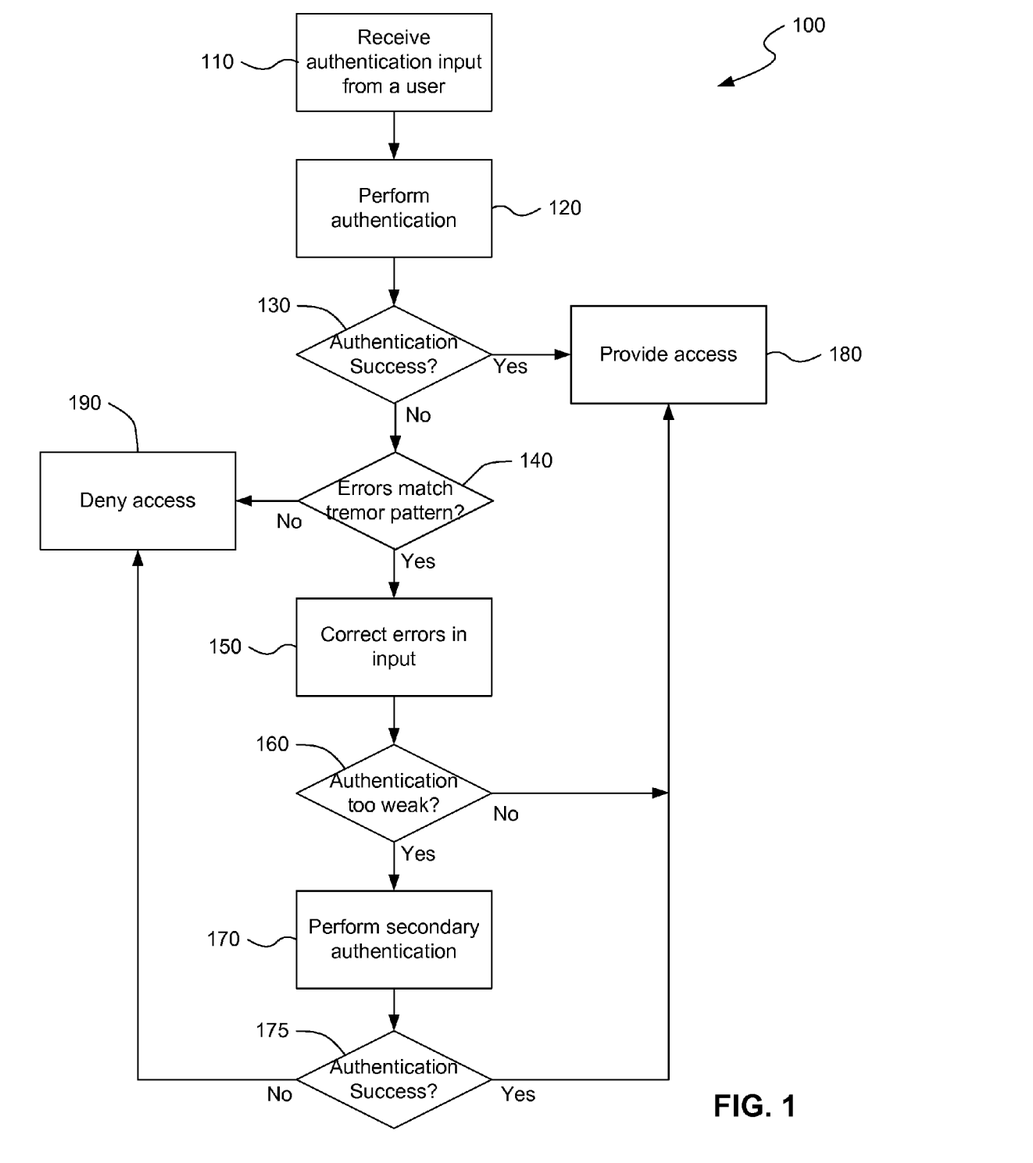
FIG. 1 depicts a flow diagram of an example method for authenticating a user in the presence of tremors.

Referring to FIG. 1, a flow diagram of an example method 100 for authenticating a user in the presence of tremors is depicted. At block 110, input is received, at a computing device, from a user for authentication. For example, the user may type a password into the computing device to log in to the computing device. At block 120, the computing device attempts authentication of the user using the received input. For example, the computing determines if a password entered by a user matches the stored password for authenticating the user. The password may be stored locally on the device, in a database accessible over a network, or elsewhere. At block 130, it is determined if the authentication was successful. If the authentication is successful, method 100 proceeds to block 180 and provides access to the user. If the authentication is not successful, method 100 may proceed to block 140 and determine if the errors in the input match a tremor pattern associated with the user. If the errors in the input do not match the tremor pattern, method 100 proceeds to block 190 and denies access to the user. If the errors in the input match the tremor pattern, method 100 proceeds to block 150 and corrects the errors in the input. At block 160, it is determined whether the correction of the errors has made the authentication security too weak. This may include determining if the security level has fallen beneath a threshold level. If the authentication is not too weak, method 100 proceeds to block 180 and provides access to the user. If the authentication is too weak, method 100 proceeds to block 170 and performs a secondary authentication. At block 175, it is determined whether the secondary authentication was successful. If the secondary authentication is successful, method 100 proceeds to block 180 and provides access. If the secondary authentication is not successful, method 100 proceeds to block 190 and denies access to the user.

Figure 2:
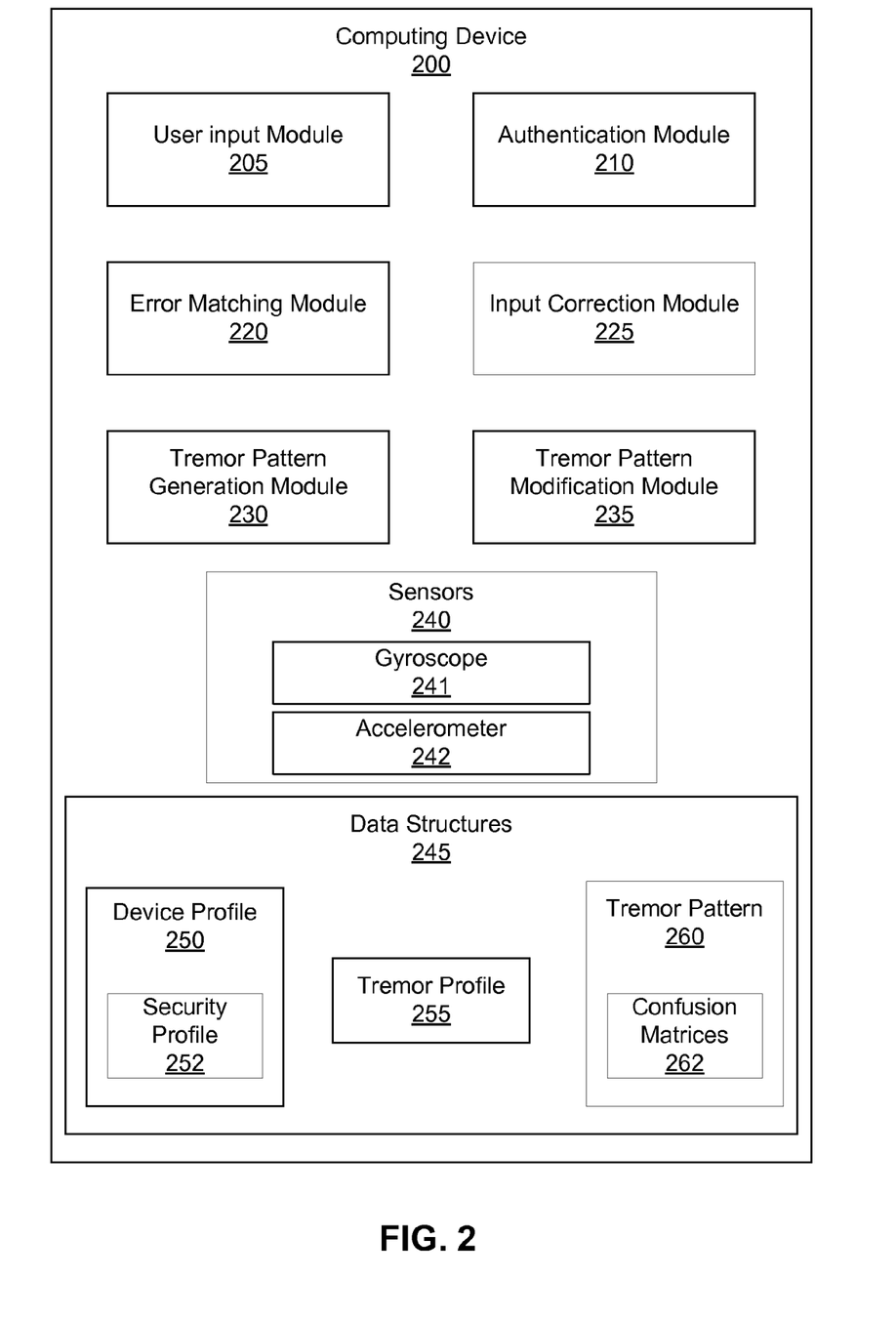
FIG. 2 depicts a block diagram of an example computing device for authenticating a user in the presence of tremors.

Referring to FIG. 2, a block diagram of an example computing device 200 for authenticating a user in the presence of tremors is depicted. Device 200 includes user input module 205, authentication module 210, error matching module 220, input correction module 225, tremor pattern generation module 230, tremor pattern modification module 235, sensors 240, and data structures 245. Sensors 240 includes a gyroscope 241 and an accelerometer 242. Data structures 245 include device profile 250, tremor profile 255, and tremor pattern 360. User input module 205 may be configured to receive input from a user for authenticating the user. Authentication module 210 may be configured to perform authentication using the input received by input module 205. Error matching module 220 may be configured to determine if errors in the input match tremor pattern 260. Input correction module 225 may be configured to correct the input if the errors match tremor pattern 260. Authentication module 210 may be further configured to perform authentication on the corrected input. Authentication module 210 may be further configured to perform a secondary authentication if the corrections to the input result in security below a specified threshold. Tremor pattern generation module may use device profile 250 and tremor profile 255 to generate tremor pattern 260. Tremor pattern modification module 235 may be configured to monitor input errors over time and modify tremor pattern 260 based on the errors over time. A security profile 252 may be part of device profile 250. Security profile 252 can specify ways of locking the capability of correcting errors by input correction module 225. For example, the security profile can specify that correction not be done on non-alphanumeric keys, on short passwords, and other cases to maintain a certain level of security. Tremor pattern 260 may include one or more confusion matrices 262 as depicted in FIG. 5.

Figure 3:
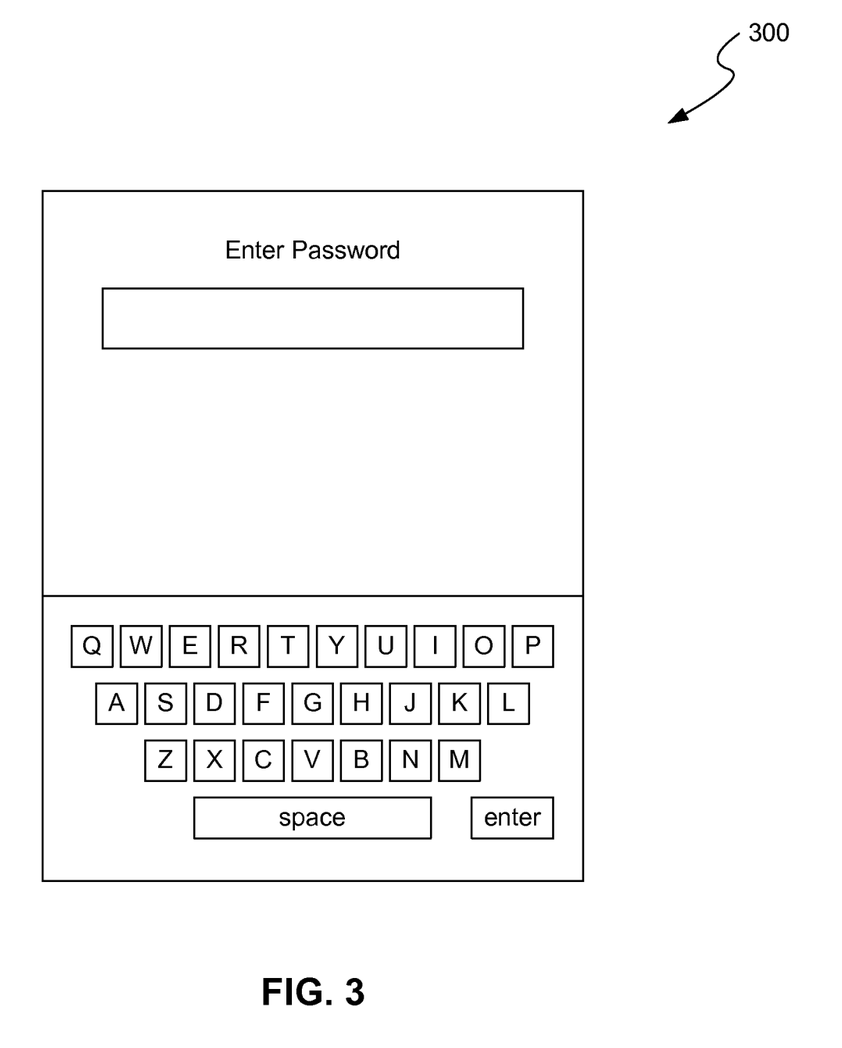
FIG. 3 depicts an example user interface for authenticating a user.

Referring to FIG. 3, an example user interface 300 for authenticating a user is depicted. User interface 300 may be displayed on a touchscreen device such as a smartphone or tablet. A device profile for a device with user interface 300 may indicate the positions and sizes of the targets for each letter in the user interface. User interface 300 may change based on the orientation of the device and a device profile may contain different information based on the orientation of the device. A tremor pattern may be created based on the device profile and a tremor profile may take into account the distance between keys and the amplitude, frequency, and orientation of tremors in identifying potential errors due to the tremors. A confusion matrix may be created for each key in user interface 300. For example, a confusion matrix for the letter "P" may indicate likelihood of a user with a tremor hitting the neighboring keys "O" and "L" while attempting to select "P." The confusion matrix may further indicate the likelihood of missing a target altogether such as, for example, missing to the right of the "P" target. In some embodiments, the tremor amplitude and orientation may provide for errors that are more than one target away from the intended target. For example, selecting "I" may be a potential error for a user attempting to select "P."

Figure 4:
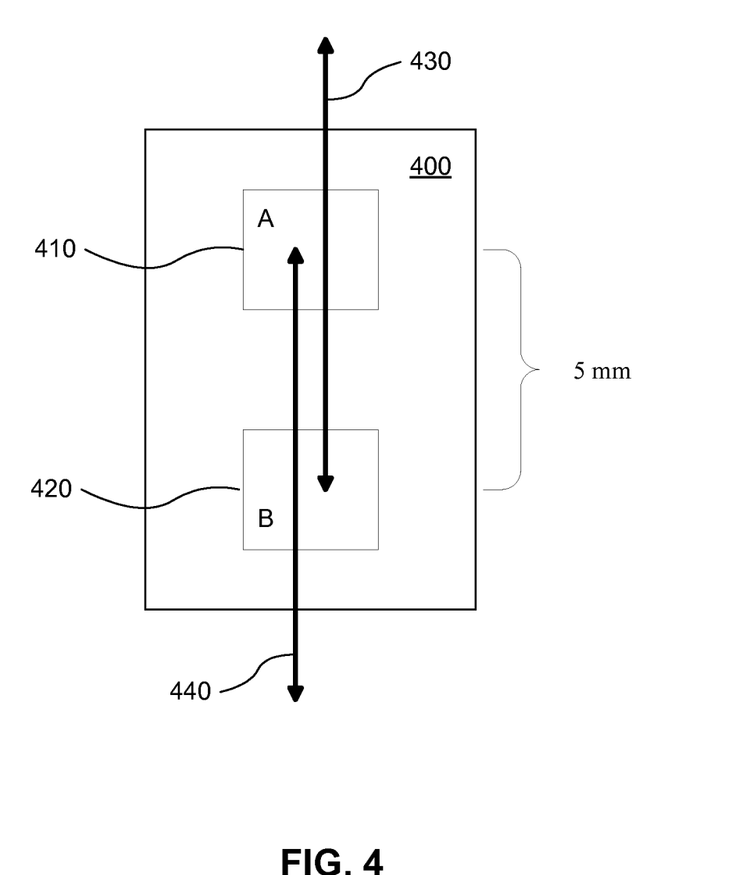
FIG. 4 depicts an example of a user interface with arrows indicating direction and amplitude of tremors.

Referring to FIG. 4, an example of a user interface 400 with arrows indicating direction and amplitude of tremors is depicted. FIG. 4 is not drawn to scale. User interface 400 is a basic example that includes target A 410 and target B 420. Target A 410 and Target B 420 represent targets whose centers are 5 mm apart as depicted in FIG. 4. Arrowed line 430 indicates the range of locations where a user may touch when attempting to select target A 410 with the user having a tremor having a vertical amplitude of 10 mm. Arrowed line 440 indicates the range of locations where a user may touch when attempting to select target B 440 with the user having a tremor having a vertical amplitude of 10 mm. For this example, it is assumed that the horizontal amplitude of the tremor is negligible. As depicted, a user may select target A 410 when attempting to select target B 420 or vice versa. Further, the user may select an area outside of either target A 410 or B 420. A confusion matrix could be created for each target using this information along with the frequency of the tremors (see FIG. 5).

Figure 5:
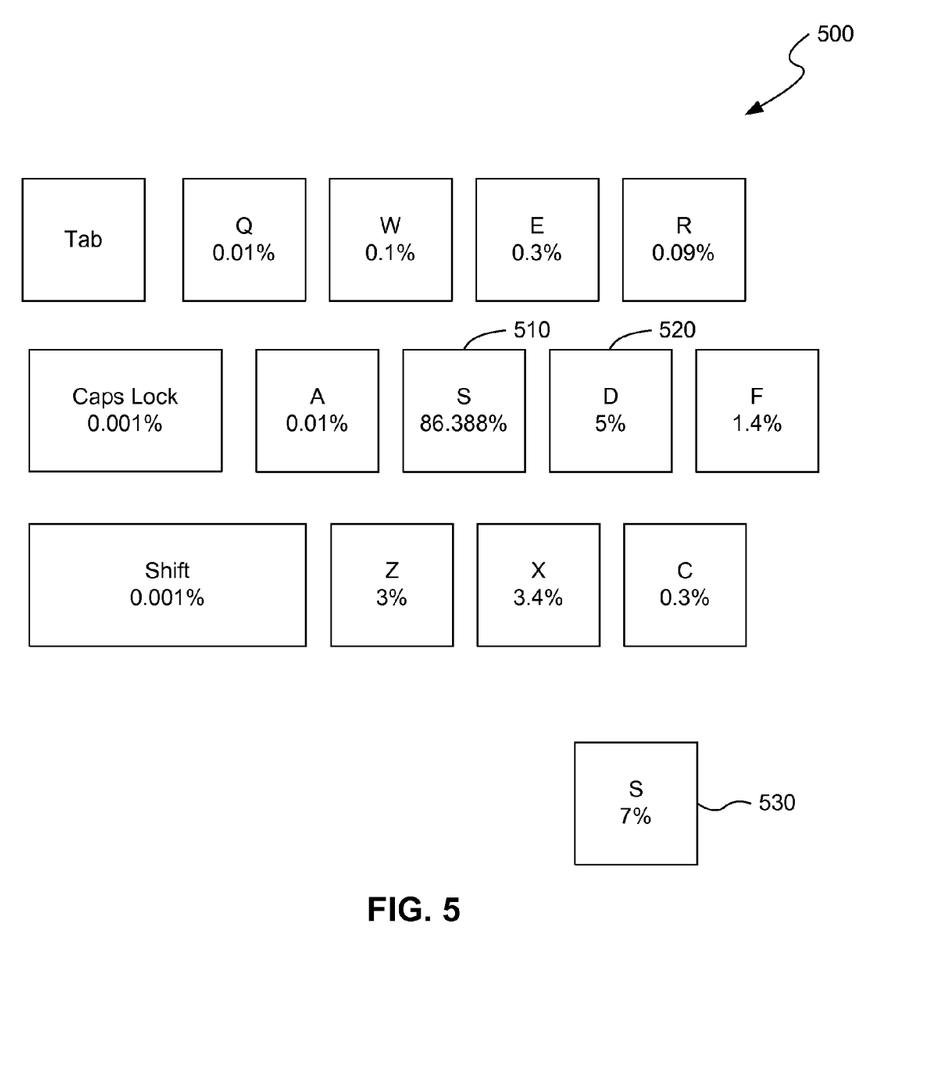
FIG. 5 depicts an example of a confusion matrix with percentages depicting the probability of a user striking a neighboring key while targeting highlighted key.

Referring to FIG. 5, an example confusion matrix 500 for a single key is shown. The target character from the password is indicated by the on-screen target 510 corresponding to that character. The surrounding boxes indicate nearby targets (in this case, other characters). Percentages in the surrounding boxes indicate the probability that this target will be hit when the user attempts to hit the correct target 510. In this example, there is a 5% chance that the user will hit the target 520 immediately to the right of the intended target. The percentage in box 530 includes the probability that a bounce error (an unwanted extra tap) will be present. In this example, a deliberate tap on this target will be followed by an unwanted extra tap in 7% of instances.

Figure 6:
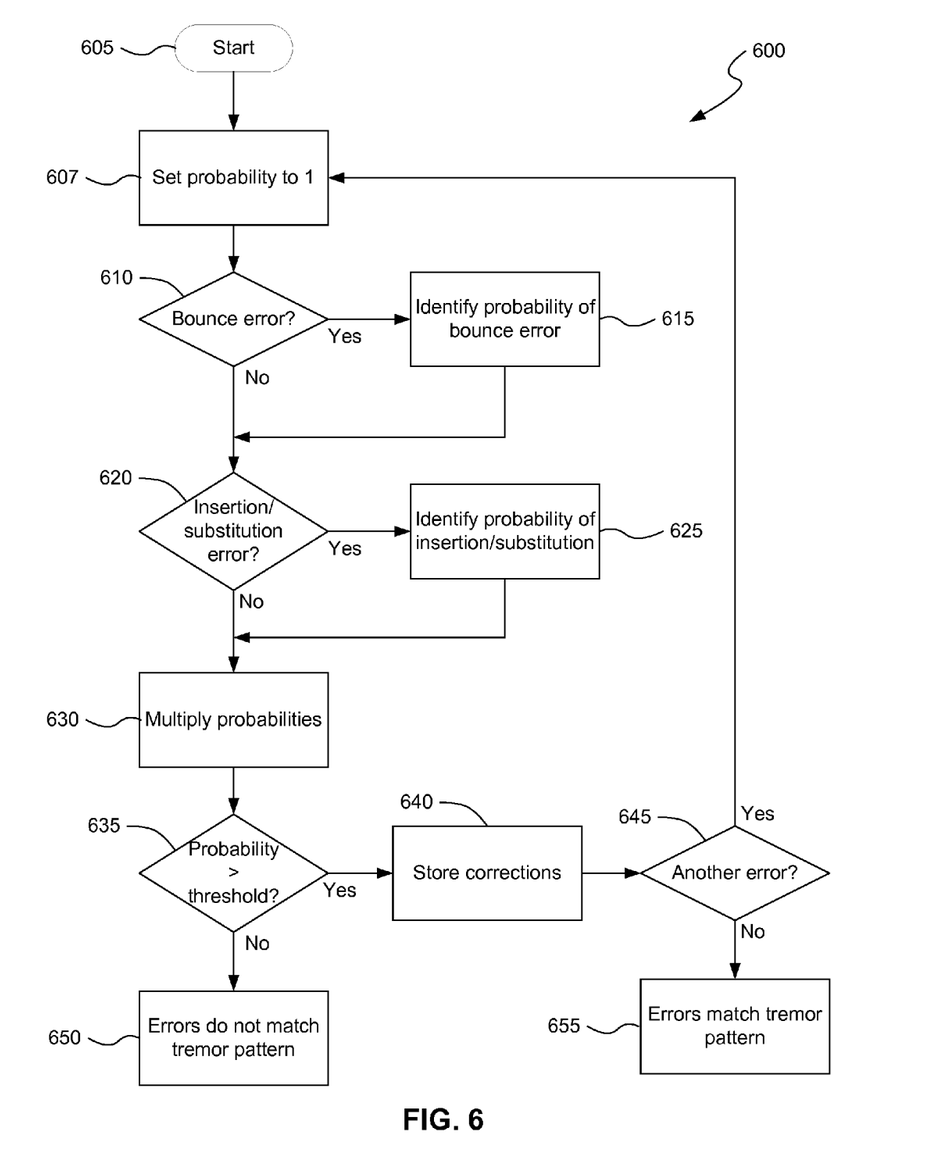
FIG. 6 depicts a high-level diagram of an example method for examining a user error caused by tremors.

When an entered password is matched against the correct password, a set of omission, insertion, and substitution errors is identified. Referring to FIG. 6, the flowchart depicts an example method 600 for examining each of the individual errors to determine if the errors match a tremor pattern. Method 600 starts at block 605. At block 607, an initial probability value is set to 1. At block 610, the procedure looks for the presence of additional copies of the entered character. If these are present, the confusion matrix is used to establish the probability of this bounce error occurring at block 615. In some embodiments, the duration of key presses and time between the key presses is also used to further refine the probability that this instance is a bounce error. Next, at block 620, the presence of other types of insertion or substitutions is tested. If an unintended character is present, the confusion matrix is used to establish the probability of that specific character being entered in place of the correct character at block 625. Next, at block 630, the bounce error and insertion/substitution errors are combined to get the probability of the correct character being intended, given the observed characters. If this probability is greater than a threshold, the error is corrected at block 640. If the probability is not greater than the threshold, the error is retained, and the password will not be accepted at block 650. Each time a correction is made at block 640, it is determined whether there is another error at block 645. If there is another error, method 600 returns to block 610. If there are no more errors, it is determined that the errors match the tremor pattern at block 655.

Figure 7:
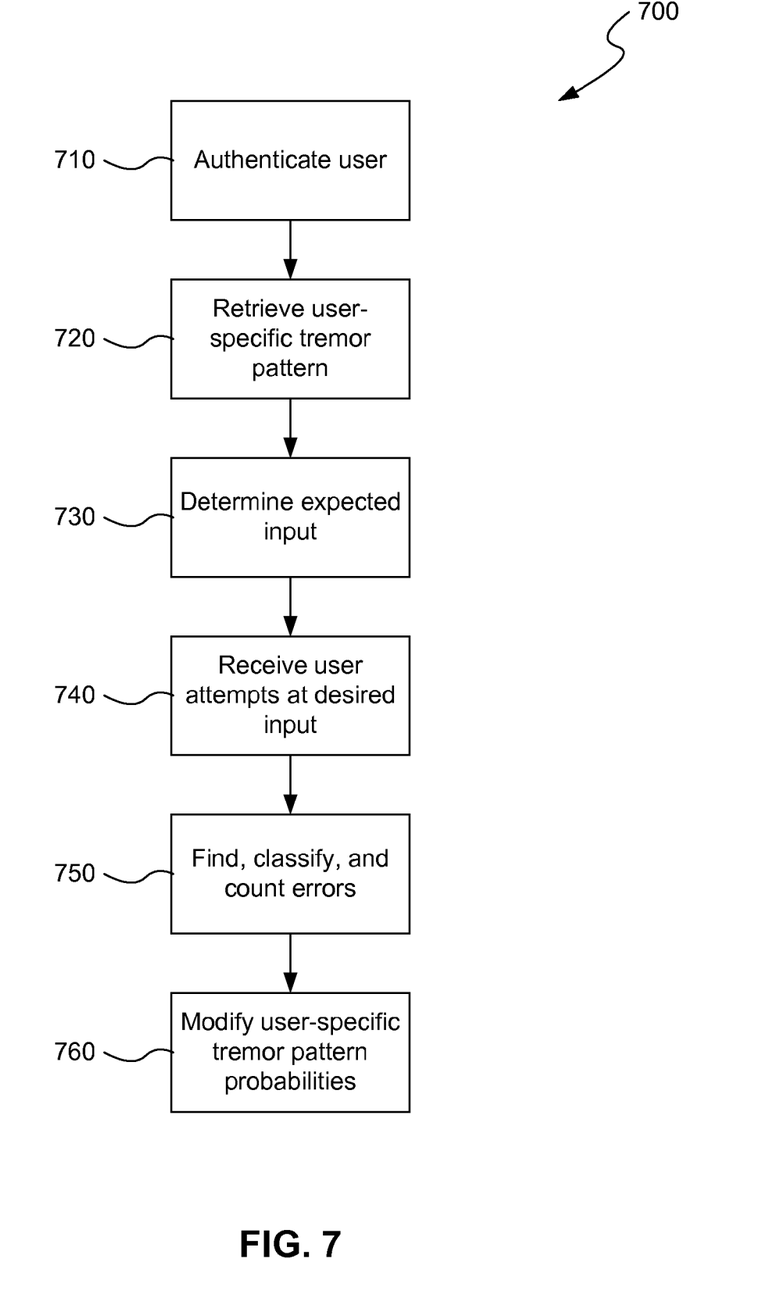
FIG. 7 depicts a flowchart of an example method for modifying a tremor pattern.

Referring to FIG. 7, a flowchart of an example method 700 for modifying a tremor pattern is depicted. At block 710, a user is authenticated. This authentication may occur using any method. At block 720, the user's specific tremor pattern is retrieved. At block 730, an expected input is determined. For example, it may be determined that the user is expected to input "bambi". At block 740, user attempts at the input are received. For example, the user may input "bamvi", "bambbi", "bamvi", and "bambi". At block 750, the errors are found, classified, and counted. In the previous example there were 2 substitutions of "v" for "b" and a bounce on "b". At block 760, the probabilities in the user-specific tremor pattern are modified based on the received errors.

Figure 8:
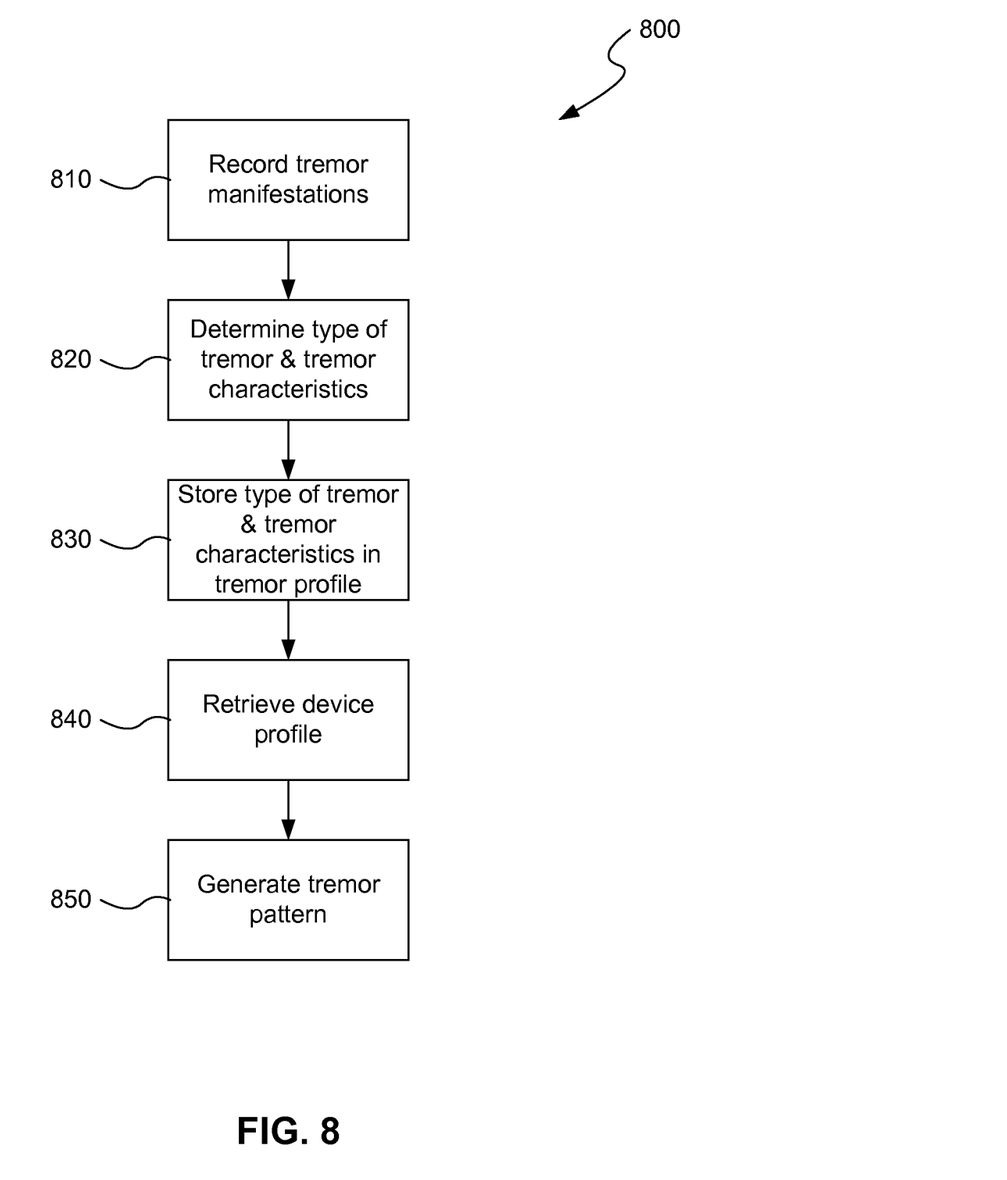
FIG. 8 depicts a flow diagram of an example method for generating a generic tremor pattern.

Referring to FIG. 8, a flow diagram of an example method 800 for generating a generic tremor pattern is depicted. As used here, generic tremor pattern refers to a tremor pattern which is specific to a type of tremor, but independent of the actual errors of a specific user. At block 810, a device, such as the device depicted in FIG. 2, records tremor manifestations as a user holds the device. The device may record the tremor manifestations using sensors such as an accelerometer and/or a gyroscope. At block 820, the type of tremor and tremor characteristics are determined based on the recorded tremor manifestations. At block 830, the type of tremor and tremor characteristics are stored in a tremor profile. At block 840, a device profile for the device is retrieved. At block 850, a tremor pattern is generated using the tremor profile and the device profile. This may include generating a confusion matrix for each target in the device profile which includes probabilities for bounces, insertions, and substitutions.

Figure 9:
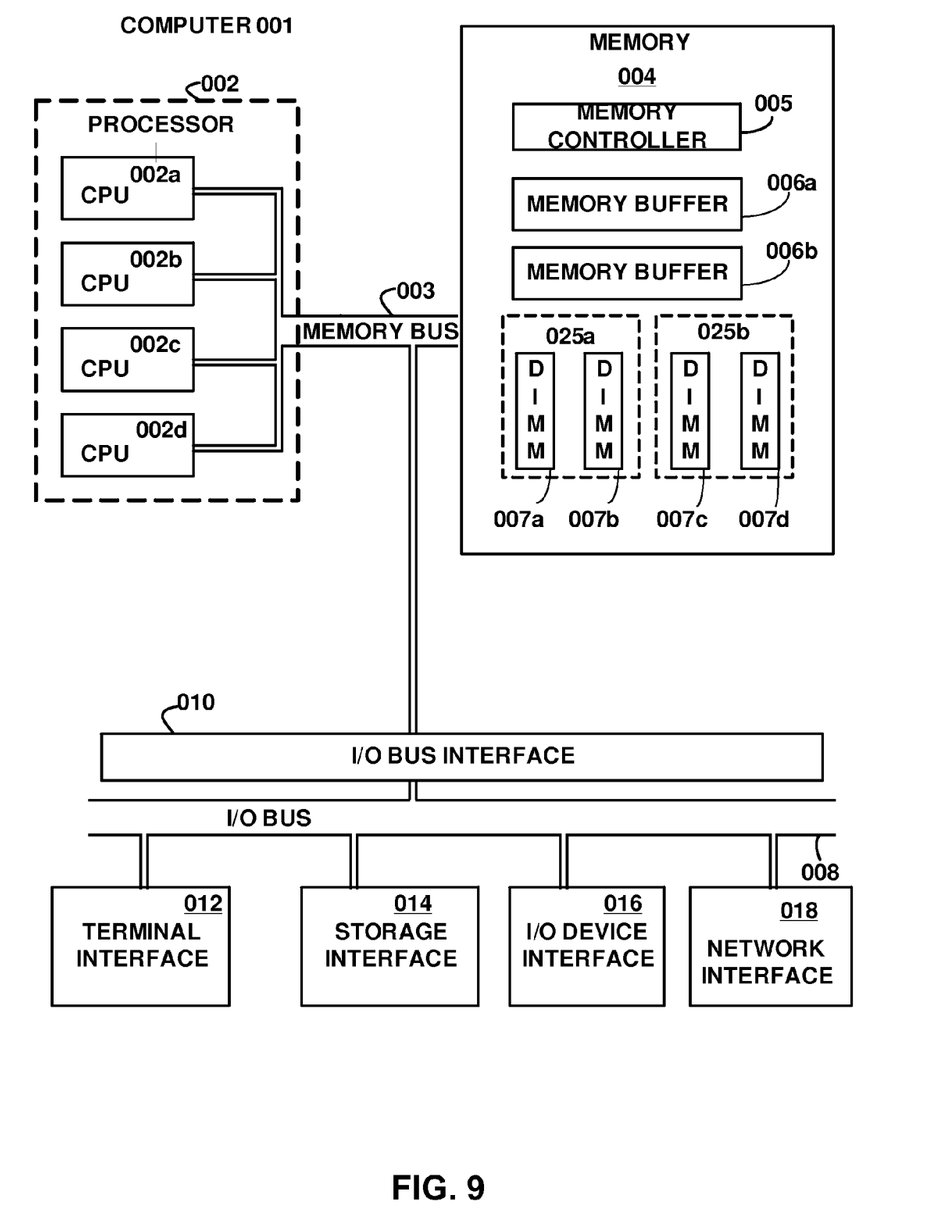
FIG. 9 depicts a high-level block diagram of an example system for implementing one or more embodiments of the invention.

Referring to FIG. 9, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 9 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 9 is intended to depict the representative major components of an exemplary computer system 001. But individual components may have greater complexity than represented in FIG. 9, components other than or in addition to those shown in FIG. 9 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for authenticating users, the method comprising:

receiving, by a device, a first input for authenticating a user;

determining the first input fails to authenticate the user;

identifying one or more errors in the first input which match a tremor pattern for the user;

correcting the one or more errors to generate a corrected input; and authenticating the user using the corrected input, wherein the tremor pattern is generated using a tremor profile and a device profile, the tremor profile comprising an amplitude of a tremor, the device profile indicating locations of targets that receive input for the device, and wherein the tremor profile further comprises a frequency of the tremor, information regarding a body part affected by the tremor, and information regarding the 3-D orientation of the body part affected by the tremor.

2. The method of claim 1, further comprising:

generating a tremor profile for the user by monitoring sensors in the device during use of the device by the user.

3. The method of claim 1, further comprising:

identifying a set of errors across a plurality of inputs;

determining an error probability based on the set of errors; and modifying the tremor pattern based on the error probability.

4. The method of claim 1, wherein the first input is received through a touchscreen.

5. The method of claim 1, wherein the correcting the one or more errors to generate a corrected input includes correcting the one or more errors according to a confusion matrix, the confusion matrix taking into account: the expected distance of errors from targets based on the amplitude and orientation of the tremor; the expected direction of errors based on the orientation of the tremor; the expected probability and timing of bounce errors based on the frequency, amplitude, and orientation of the tremor; and the expected errors for a given affected body part, the method further comprising:

determining that the correcting the one or more errors to generate the corrected input results in security below a threshold level; and authenticating the user using a second form of authentication, wherein the authenticating the user using the corrected input occurs in response to the authenticating the user using the second form of authentication.

6. A computer program product for authenticating users, the computer program product comprising a computer readable storage medium having program instructions embodied therewith, the program instructions executable by a computing device to cause the device to perform a method comprising:
receiving a first input for authenticating a user;
determining the first input fails to authenticate the user;
identifying one or more errors in the first input which match a tremor pattern for the user;
correcting the one or more errors to generate a corrected input; and
authenticating the user using the corrected input, wherein the tremor pattern is generated using a tremor profile and a device profile, the tremor profile comprising an amplitude of a tremor, the device profile indicating locations of targets that receive input for the device, and wherein the tremor profile further comprises a frequency of the tremor, information regarding a body part affected by the tremor, and information regarding the 3-D orientation of the body part affected by the tremor.

7. The computer program product of claim 6, wherein the method further comprises:
generating a tremor profile for the user by monitoring sensors in the device during use of the device by the user.

8. The computer program product of claim 6, wherein the method further comprises:
identifying a set of errors across a plurality of inputs;
determining an error probability based on the set of errors; and
modifying the tremor pattern based on the error probability.

9. The computer program product of claim 6, wherein the first input is received through a touchscreen.

10. The computer program product of claim 6, wherein the correcting the one or more errors to generate a corrected input includes correcting the one or more errors according to a confusion matrix, the confusion matrix taking into account: the expected distance of errors from targets based on the amplitude and orientation of the tremor; the expected direction of errors based on the orientation of the tremor; the expected probability and timing of bounce errors based on the frequency, amplitude, and orientation of the tremor; and the expected errors for a given affected body part, wherein the method further comprises:
determining that the correcting the one or more errors to generate the corrected input results in security below a threshold level; and
authenticating the user using a second form of authentication.

11. A system for authenticating users, the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions configured to cause the system to perform a method comprising:
receiving a first input for authenticating a user;
determining the first input fails to authenticate the user;
identifying one or more errors in the first input which match a tremor pattern for the user;
correcting the one or more errors to generate a corrected input; and
authenticating the user using the corrected input, wherein the correcting the one or more errors to generate a corrected input includes correcting the one or more errors according to a confusion matrix, the confusion matrix taking into account: the expected distance of errors from targets based on the amplitude and orientation of the tremor; the expected direction of errors based on the orientation of the tremor; the expected probability and timing of bounce errors based on the frequency, amplitude, and orientation of the tremor; and the expected errors for a given affected body part, and wherein the method further comprises:
determining that the correcting the one or more errors to generate the corrected input results in security below a threshold level; and
authenticating the user using a second form of authentication.

12. The system of claim 11, wherein the tremor pattern is generated using a tremor profile and a device profile, the tremor profile comprising an amplitude of a tremor, the device profile indicating locations of targets that receive input for the system.

13. The system of claim 12, further comprising:
one or more sensors, wherein the method further comprises generating a tremor profile for the user by monitoring the one or more sensors during use of the system by the user.

14. The system of claim 12, wherein the tremor profile further comprises a frequency of the tremor.

15. The system of claim 11, wherein the method further comprises:
identifying a set of errors across a plurality of inputs;
determining an error probability based on the set of errors; and
modifying the tremor pattern based on the error probability.

* * * * *

UNITED STATES PATENT AND TRADEMARK OFFICE
CERTIFICATE OF CORRECTION

PATENT NO. : 9,747,734 B2  
APPLICATION NO. : 14/568473  
DATED : August 29, 2017  
INVENTOR(S) : Chaar et al.

Page 1 of 1

It is certified that error appears in the above-identified patent and that said Letters Patent is hereby corrected as shown below:

On the Title Page

Item (73) Assignee should be listed as International Business Machines Corporation (not International Busines Machines Corporation).

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*